(12) United States Patent
Kato et al.

(10) Patent No.: US 10,910,984 B2
(45) Date of Patent: Feb. 2, 2021

(54) POWER CONVERSION DEVICE AND VEHICLE DRIVE SYSTEM TO WHICH SAME IS APPLIED

(71) Applicant: Mitsubishi Electric Corporation, Chiyoda-ku (JP)

(72) Inventors: Sho Kato, Chiyoda-ku (JP); Yoshinori Yamashita, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 537 days.

(21) Appl. No.: 15/524,438

(22) PCT Filed: May 9, 2016

(86) PCT No.: PCT/JP2016/063717
§ 371 (c)(1),
(2) Date: May 4, 2017

(87) PCT Pub. No.: WO2016/185924
PCT Pub. Date: Nov. 24, 2016

(65) Prior Publication Data
US 2018/0287544 A1 Oct. 4, 2018

(30) Foreign Application Priority Data
May 20, 2015 (JP) .................... 2015-102514

(51) Int. Cl.
*H02P 3/18* (2006.01)
*H02P 27/08* (2006.01)
(Continued)

(52) U.S. Cl.
CPC ............ *H02P 27/085* (2013.01); *H02M 1/32* (2013.01); *H02M 1/38* (2013.01);
(Continued)

(58) Field of Classification Search
CPC ....... G01R 31/343; H02P 27/04; H02P 27/08; H02P 27/085; H02M 2001/0009;
(Continued)

(56) References Cited

U.S. PATENT DOCUMENTS 7,541,769 B2  6/2009  Nawa et al.
7,825,620 B2  11/2010  Nakatsugawa et al.
(Continued)

FOREIGN PATENT DOCUMENTS

DE  100 32 321 A1  1/2001
EP  2 426 814 B1  4/2014
(Continued)

OTHER PUBLICATIONS

International Search Report dated Jul. 19, 2016 in PCT/JP2016/063717 filed May 9, 2016.
(Continued)

*Primary Examiner* — Eduardo Colon Santana
*Assistant Examiner* — Zemenay T Truneh
(74) *Attorney, Agent, or Firm* — Xsensus LLP

(57) ABSTRACT

A control unit is configured to generate a first switching signal based on a voltage command value and a first carrier and a second switching signal based on the voltage command value and a second different carrier, and a characteristic calculation unit estimates and calculates at least one of a resistance value of an electric motor and a dead time error, which is the difference between an effective value of a dead time and a set value of the dead time, based on a first operating characteristic of a power conversion unit obtained when switching elements are driven with the first switching signal and a second operating characteristic of the power conversion unit obtained when the switching elements are driven with the second switching signal. The resistance value of the electric motor and the dead time error can be quickly calculated and estimated by a common structure.

18 Claims, 7 Drawing Sheets

(51) Int. Cl.
  *H02M 1/32* (2007.01)
  *H02M 1/38* (2007.01)
  *H02M 7/5387* (2007.01)
  *H02P 21/00* (2016.01)
  *H02M 7/5395* (2006.01)
  *B61C 3/00* (2006.01)
  *H02M 1/00* (2006.01)

(52) U.S. Cl.
  CPC ........ *H02M 7/53871* (2013.01); *H02P 27/08* (2013.01); *B61C 3/00* (2013.01); *H02M 7/5395* (2013.01); *H02M 2001/0009* (2013.01); *H02M 2001/385* (2013.01)

(58) Field of Classification Search
  CPC ...... H02M 7/53871; H02M 1/38; H02M 1/32; H02M 7/5395
  USPC ............................................ 318/400.17, 812
  See application file for complete search history.

(56) References Cited

U.S. PATENT DOCUMENTS

| | | | | |
|---|---|---|---|---|
| 8,035,334 | B2* | 10/2011 | Kobayashi | H02M 7/5395 318/812 |
| 8,829,832 | B2 | 9/2014 | Shouji | |
| 2004/0138837 | A1* | 7/2004 | Fujii | G01R 31/343 702/64 |
| 2012/0274260 | A1* | 11/2012 | Takahashi | B62D 5/0487 318/490 |
| 2012/0286292 | A1* | 11/2012 | Nakayama | H01L 25/18 257/77 |
| 2014/0054103 | A1* | 2/2014 | Kezobo | B62D 5/0487 180/446 |
| 2014/0225547 | A1 | 8/2014 | Yokozutsumi et al. | |
| 2018/0287544 | A1* | 10/2018 | Kato | H02M 1/32 |

FOREIGN PATENT DOCUMENTS

| | | |
|---|---|---|
| JP | 3-117347 A | 5/1991 |
| JP | 3329831 B2 | 9/2002 |
| WO | 98/42067 A1 | 9/1998 |
| WO | WO 2009/078216 A1 | 6/2009 |

OTHER PUBLICATIONS

Hidehiko Sugimoto, "Theory and Reality of Design of AC Servo System" Sogo Denshi Shuppan, May 1990, pp. 54-59 (with English Abstract).

Indian Office Action dated Feb. 3. 2020 in Indian Patent Application No. 201747039022 (with unedited computer generated English translation), 10 pages.

Office Action dated Nov. 27, 2020 in German Patent Application No. 11 2016 002 281.6, 7 pages.

* cited by examiner

*FIG. 6*
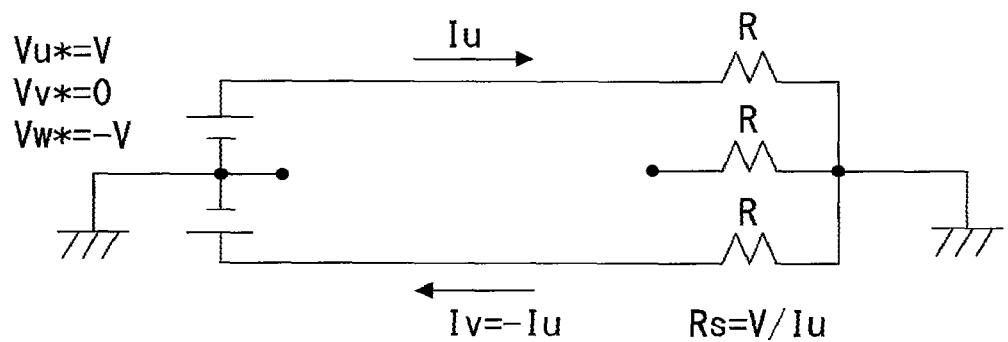
(a) CASE WHERE THERE IS NO DEAD TIME ERROR
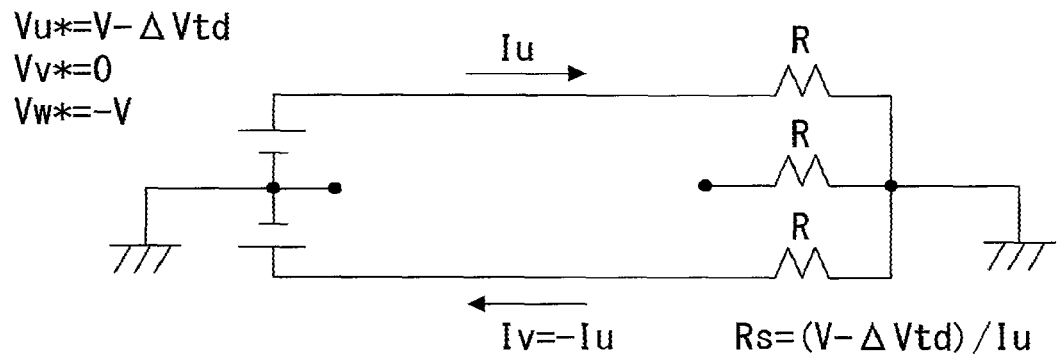
(b) CASE WHERE THERE IS DEAD TIME ERROR

POWER CONVERSION DEVICE AND VEHICLE DRIVE SYSTEM TO WHICH SAME IS APPLIED

TECHNICAL FIELD

The present invention relates to a power conversion device that performs pulse width modulation (hereinafter, referred to as PWM) control and calculates an actual resistance value of an electric motor or an actual dead time error.

BACKGROUND ART

A variable-speed electric motor control device composed of a power conversion device has been applied to various fields including railway vehicles, elevators, electric vehicles, and general-purpose inverters. In such various fields, higher performance and further improvement of reliability, such as improvement of accuracy of output torque or speed control of an electric motor, high efficiency, low noise, and the like of the electric motor, are expected. For the improvement of control performance as described above, it is necessary to quickly obtain the circuit constant of the electric motor and appropriately design a control parameter.

Meanwhile, the circuit constant of an electric motor is known to vary depending on the temperature or the operating state of the electric motor. Means for performing identification, that is, estimation, with high accuracy off-line (in a state where acceleration/deceleration control or torque control is not performed on the electric motor, by providing a special mode for identification, etc.) for such variation of the circuit constant, is disclosed in, for example, Patent Document 1 described below. As in Patent Document 1, by individually applying sinusoidal voltages having preset two different frequencies in a rotation stop state of an electric motor such that an alternating flux occurs, it is possible to identify a winding resistance value with high accuracy even though some time is taken.

Further, in PWM control, a short circuit prevention time, that is, a so-called dead time, is provided for preventing short circuit of a DC power source for two switching elements. Due to the dead time, an output voltage error occurs, so that it is necessary to take a measure for compensating for the output voltage error. For this, for example, Non-Patent Document 1 described below has proposed various methods for eliminating influence of the dead time.

CITATION LIST

Patent Document

Patent Document 1: Domestic Re-publication of PCT International Publication for Patent Application No. WO2009/078216

Non-Patent Document

Non-Patent Document 1: "AC Sabo Sisutemu No Riron To Sekkei No Jissai (Theory and Reality of Design of AC Servo System)" by Hidehiko Sugimoto, Sogo Denshi Shuppan, May 1990, the 3rd chapter, p 54-59

SUMMARY OF THE INVENTION

Problems to be Solved by the Invention

Regarding the above-described dead time, an actual effective value thereof is made different from a set value thereof, which is set and added in a control configuration, due to various factors such as the characteristics of semiconductor elements forming a conversion device and a factor caused by a circuit configuration, so that it is necessary to accurately recognize a dead time error that is the difference between these values. Therefore, recognition of an actual resistance value of an electric motor and an actual dead time error is an important factor for improving control performance.

However, Patent Document 1 describes in detail a method for calculating a resistance value, but does not disclose a dead time error, and requires additional means in order to obtain a dead time error. In addition, in the method of Patent Document 1, it is necessary to change the frequency of an AC power supply of a main circuit and measure a voltage, a current, and the like at each frequency. Thus, the method takes a long period of time until reaching a condition under which the measurement is possible.

Non-Patent Document 1 has proposed a method for compensating for an output voltage error due to a set dead time, but does not disclose at all a method for obtaining an actual dead time error.

Therefore, both documents cannot be said to be able to sufficiently contribute to improvement of control performance.

The present invention has been made to solve the above-described conventional problems, and an object of the present invention is to obtain: a power conversion device that is able to calculate and estimate a resistance value of an electric motor and a dead time error in a short time by the same common means; and a vehicle drive system to which the power conversion device is applied.

Solution to the Problems

A power conversion device according to the present invention is a power conversion device including: a power conversion unit having a bridge formed by connecting switching elements in series with each other between both electrodes of a DC power supply, the power conversion unit converting a voltage of the DC power supply and supplying the converted voltage to an electric motor; a current detection unit detecting a current flowing into the electric motor; and a control unit setting and adding a dead time for preventing DC short circuit caused by the switching elements forming the bridge, and generating a switching signal for performing ON-OFF drive of the switching elements, through PWM control on the basis of a voltage command value and a carrier, wherein the control unit is configured to be able to generate a first switching signal based on the voltage command value and a first carrier and a second switching signal based on the voltage command value and a second carrier having a frequency different from a frequency of the first carrier, and the power conversion device comprises a characteristic calculation unit estimating and calculating either one of or both a resistance value of the electric motor and a dead time error, which is a difference between an effective value of the dead time and a set value of the dead time, on the basis of a first operating characteristic of the power conversion unit obtained when the switching elements are driven with the first switching signal and a second operating characteristic of the power conversion unit obtained when the switching elements are driven with the second switching signal.

Effect of the Invention

The control unit of the power conversion device according to the present invention is configured to be able to generate: the first switching signal based on the voltage command value and the first carrier; and the second switching signal based on the voltage command value and the second carrier having a frequency different from the frequency of the first carrier. Additionally, the characteristic calculation unit is included which estimates and calculates either one of or both the resistance value of the electric motor and the dead time error on the basis of: the first operating characteristic of the power conversion unit obtained when the switching elements are driven with the first switching signal; and the second operating characteristic of the power conversion unit obtained when the switching elements are driven with the second switching signal. Thus, by the same characteristic calculation unit, not only either the resistance value of the electric motor or the dead time error can be estimated and calculated, but both of them can also be estimated and calculated simultaneously. In addition, the conditions for a main circuit are not changed as in Patent Document 1, it is sufficient to change the settings for control, and estimation and calculation in a short time is realized.

BRIEF DESCRIPTION OF THE DRAWINGS

FIG. 6 is a diagram showing an equivalent circuit when operations of a power conversion unit 1 and an electric motor 7 reach a steady state in the configuration of FIG. 5.

DESCRIPTION OF EMBODIMENTS

Embodiment 1

Figure 1:
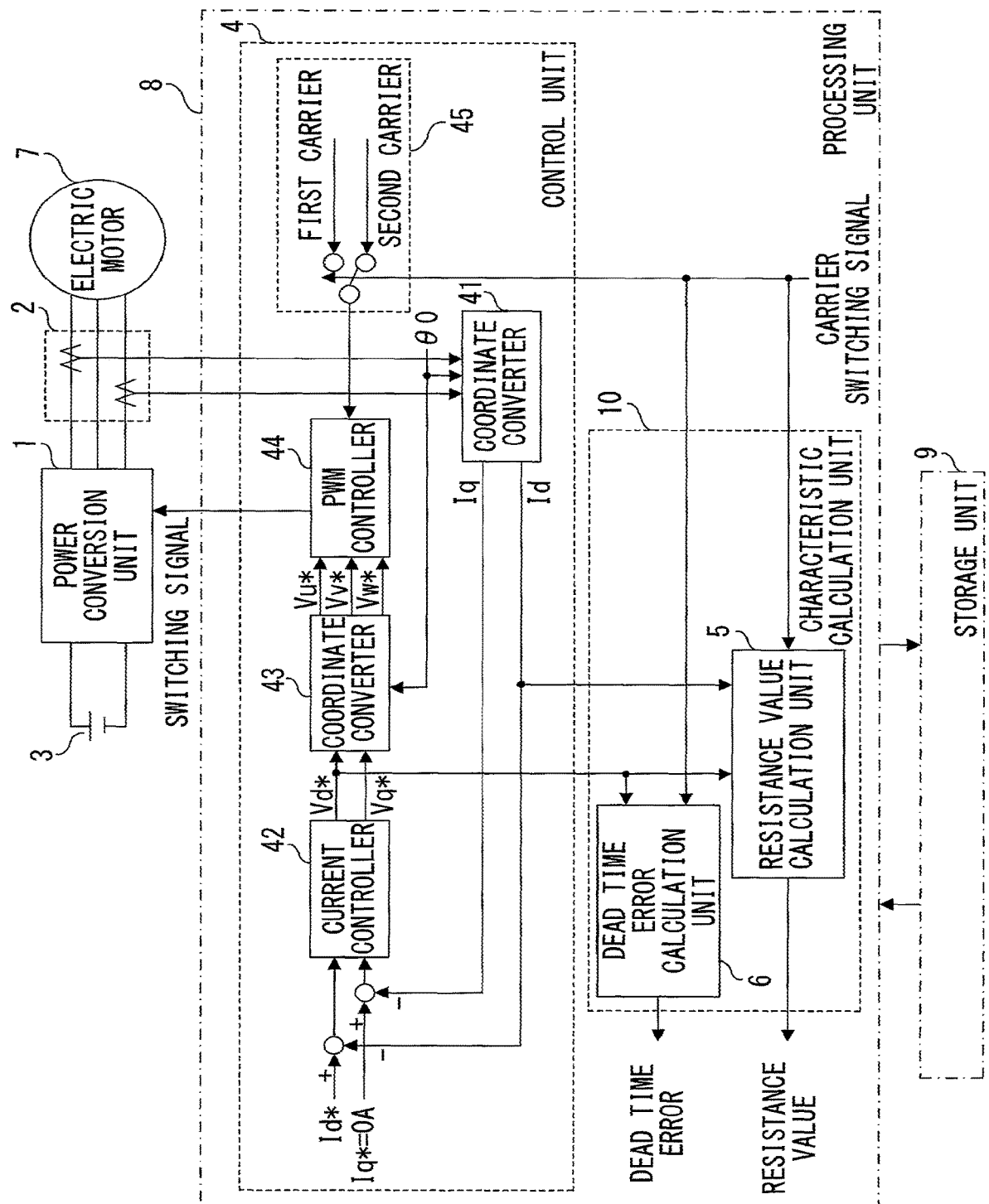
FIG. 1 is a diagram showing the entire configuration of a power conversion device according to Embodiment 1 of the present invention.

FIG. 1 is a block diagram showing the entire configuration of a power conversion device according to Embodiment 1 of the present invention. In FIG. 1, a power conversion unit 1: converts the voltage of a DC power supply 3 and supplies the converted voltage to an electric motor 7; has a bridge which is formed by connecting switching elements, such as IGBTs or MOSFETs, in series with each other between both electrodes of the DC power supply 3 and whose internal configuration is not shown since the internal configuration is publicly known; and has a function to convert DC power supplied from the DC power supply 3 to variable-voltage variable-frequency AC power and supply the AC power to the electric motor 7. The frequency of the variable-voltage variable-frequency AC power includes DC power of 0 Hz.

Current detection units 2 individually detect respective phase currents supplied to the electric motor 7 by the power conversion unit 1, and send the detected phase currents to a control unit 4 described later. Each current detection unit 2 is not limited to a CT (Current Transformer) for detecting a current flowing through a connection wire between the power conversion unit 1 and the electric motor 7 as shown in FIG. 1, and may be configured to detect a current flowing through a shunt resistor or the like. In addition, the phase currents of three phases satisfy the relation of Iu+Iv+Iw=0. Thus, for example, one of the current detection units 2 may be omitted, and the phase current Iw may be calculated from the phase currents Iu and Iv detected by the remaining two current detection units 2, respectively.

The control unit 4 is configured by a control system using a publicly known dq-axis rotating coordinate system having two orthogonal axes. Specifically, the control unit 4 includes a coordinate converter 41, a current controller 42, a coordinate converter 43, a PWM controller 44, and a selector 45. Hereinafter, these components will be described.

The coordinate converter 41 receives the respective phase currents from the current detection units 2 and outputs d-axis and q-axis currents Id and Iq.

Here, in the present invention, the d axis is an axis indicating the direction of the flux of a rotor of the electric motor 7, and the q axis is defined as an axis that is directed to be orthogonal to the d axis and on which an output torque of the electric motor 7 is controlled.

The current controller 42 generates a voltage command value such that the deviation between a current command value and a current detection value detected by each current detection unit 2 becomes zero. Specifically, the current controller 42: receives the differences between the d-axis and q-axis currents Id and Iq and desired current command values Id* and Iq*; and outputs voltage command values Vd* and Vq* on the basis of the following calculation expression (1).

[Mathematical 1]

[Mathematical 1]

$$\left.\begin{array}{l}Vd^* = kcp\left(1 + \dfrac{\omega cpi}{s}\right)(Id^* - Id) \\ Vq^* = kcp\left(1 + \dfrac{\omega cpi}{s}\right)(Iq^* - Iq)\end{array}\right\} \quad (1)$$

For example, when the electric motor 7 in Embodiment 1 is an inductive electric motor, a proportional gain kcp and a time constant ωcpi in the above expression (1) are represented by the following expression (2).

ωcc in the following expression (2) is a predetermined current response target value for designing the response speeds of the d-axis and q-axis currents Id and Iq to be controlled by the control unit 4, and is determined in consideration of a carrier frequency of the PWM controller 44 described later and a requirement specification for controlling currents to be supplied to the electric motor 7.

In addition, Ls in the following expression (2) is the primary-side inductance of the inductive electric motor and is the sum of the mutual inductance and the primary leakage inductance of the inductive electric motor.

[Mathematical 2]

$$\left.\begin{array}{l}kcp = \omega cc \cdot Ls \\ \omega cpi = \dfrac{\omega cc}{10}\end{array}\right\} \quad (2)$$

The coordinate converter 43 receives the voltage command values Vd* and Vq* and outputs phase voltage command values Vu*, Vv*, and Vw*. Although described later in detail with reference to FIG. 2, the PWM controller 44 receives the phase voltage command values Vu*, Vv*, and Vw*, performs PWM control on the basis of a desired carrier, and outputs a switching signal to the power conversion unit 1. The selector 45 receives a carrier switching signal and outputs the desired carrier to the PWM controller 44.

Figure 2:
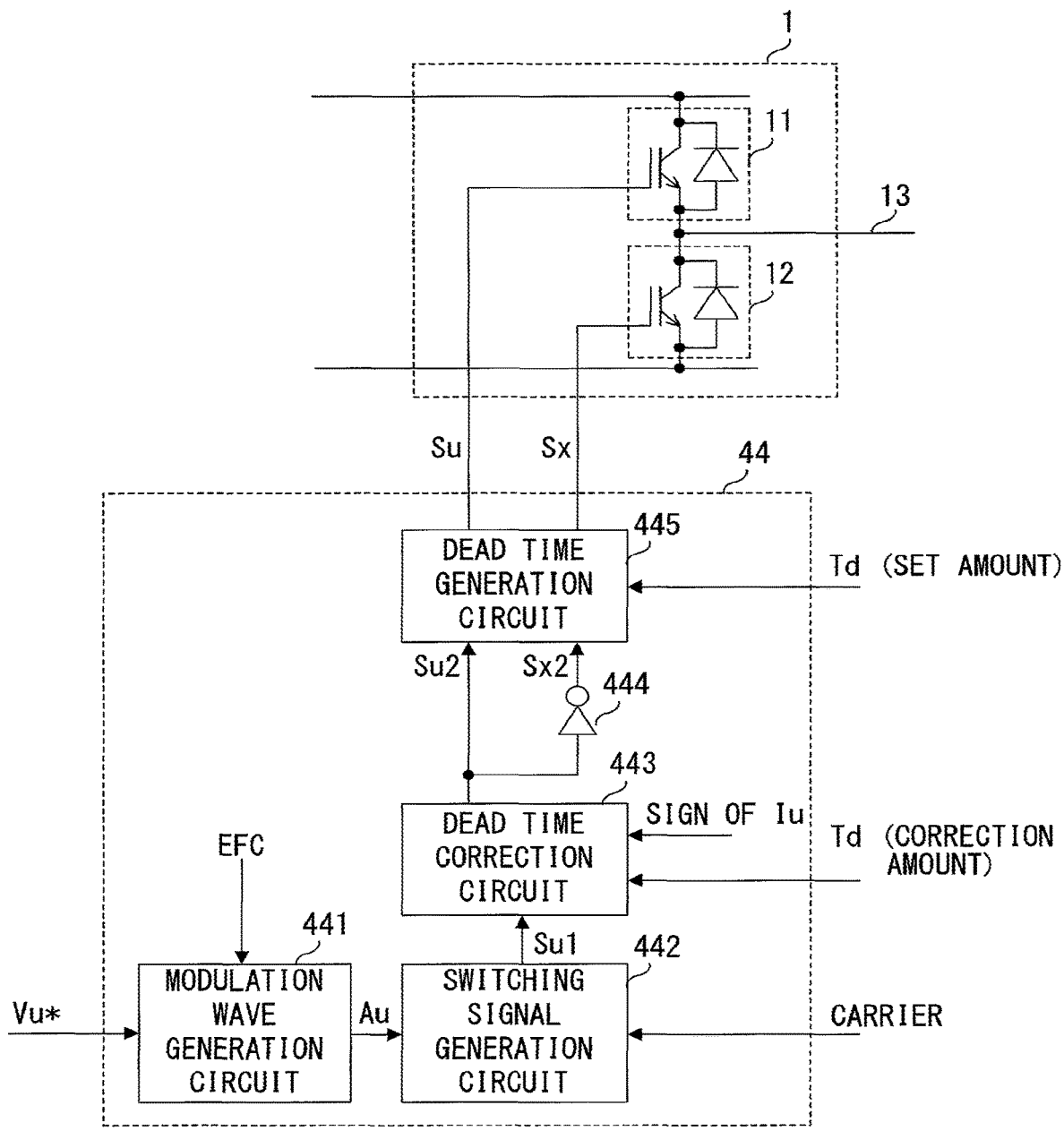
FIG. 2 is a diagram showing the internal configurations of a power conversion unit 1 and a PWM controller 44 in FIG. 1.

FIG. 2 shows an internal configuration example of the power conversion unit 1 and the PWM controller 44 in FIG. 1. The configuration in FIG. 2 shows only one phase (U phase) of the three-phase power conversion device. The other phases have the same configuration, and thus the description thereof is omitted here. The configuration shown in FIG. 2 is a publicly known technique, and the present invention is not particularly limited to this configuration.

In FIG. 2, in the power conversion unit 1, an upper switching unit 11 and a lower switching unit 12 that are the switching elements are connected in series with each other with respect to the DC power supply 3 to form the bridge, and an intermediate terminal 13 therebetween is connected to the electric motor 7.

In the power conversion device that supplies currents to the electric motor 7 on the basis of a switching operation performed through PWM control, when both of the two switching units connected in series at each phase are simultaneously ON (are brought into a conduction state) even for a very short time, DC power supply short circuit is caused, leading to breakage of the switching units. Thus, it is necessary to provide a period in which both of the series-connected two switching units are OFF (are brought into a non-conduction state), when the switching signal is switched through PWM control. This period is called a short circuit prevention period (hereinafter, referred to as a dead time). In addition, when such a dead time is present, an error occurs in an output voltage as described later.

Figure 3:
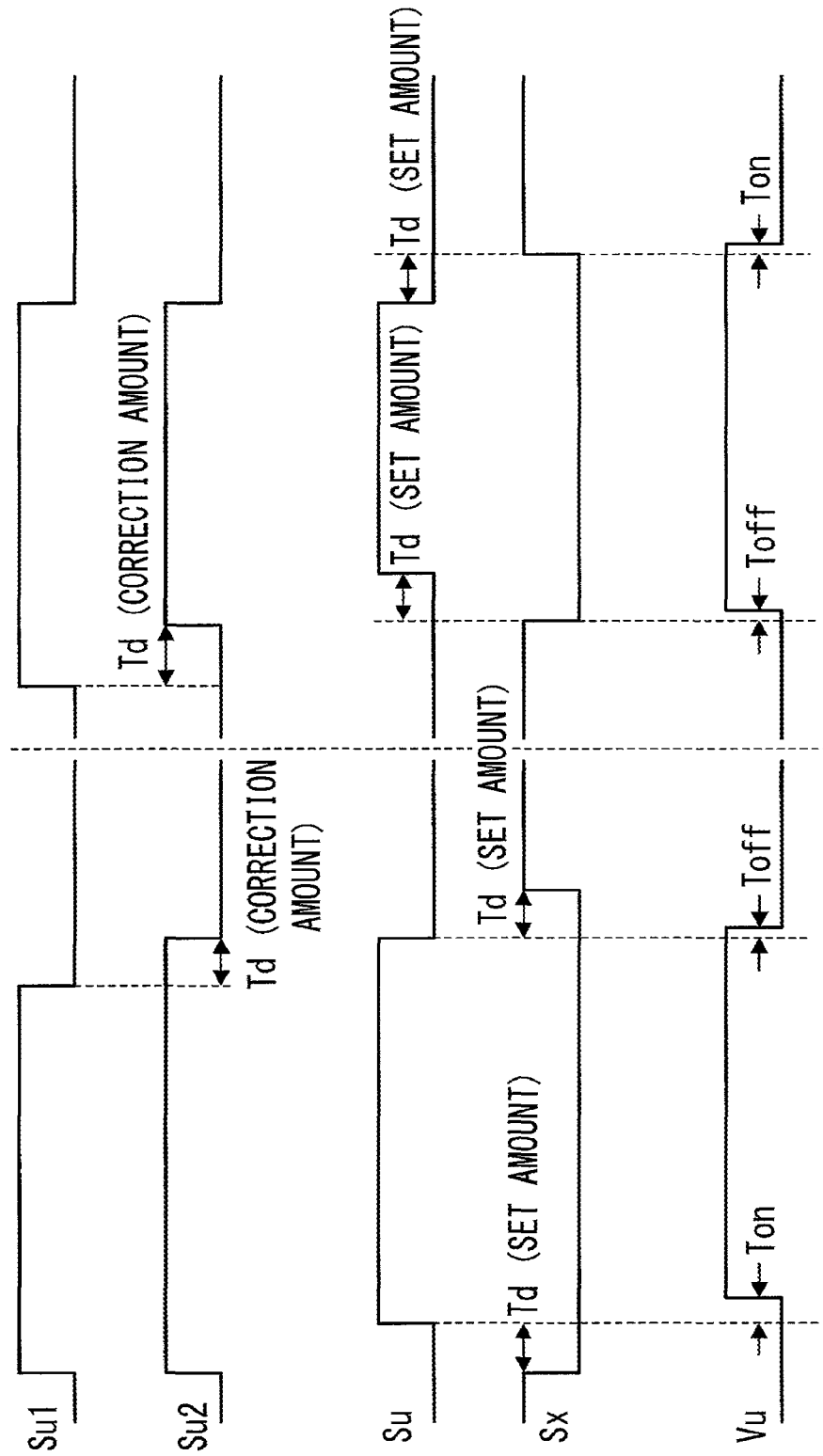
FIG. 3 is a diagram illustrating an operation of the PWM controller 44 in FIG. 2.

FIG. 3.24 of Non-Patent Document 1 listed above shows that an output voltage error ΔVtd=Td×Fc×EFC occurs due to the dead time. Here, Td is the dead time, Fc is the frequency of a carrier, and EFC is the voltage value of the DC power supply 3.

The PWM controller 44 shown in FIG. 2 is configured by considering the above, and the configuration and operation of the PWM controller 44 will be described below with reference to FIG. 2.

A modulation wave generation circuit 441 receives the U-phase voltage command Vu* and normalize the U-phase voltage command Vu* with the voltage value EFC of the DC power supply 3 to generate a U-phase modulation wave Au. Here, the configuration in which the voltage value EFC of the DC power supply 3 is assumed as a previously known value is shown in FIG. 2. However, in the case where the voltage value EFC of the DC power supply 3 varies, desirably, a sensor for detecting the voltage value of the DC power supply 3 is provided and the normalization is performed with the detected voltage value to generate the U-phase modulation wave Au.

A switching signal generation circuit 442 generates a previous-stage switching signal Su1 on the basis of the magnitude relation between the U-phase modulation wave Au and the carrier through PWM control.

A dead time correction circuit 443 corrects the previous-stage switching signal Su1 so as to compensate for an output voltage error occurring due to the dead time, to generate a subsequent-stage switching signal Su2.

Specifically, adjustment is performed as follows. When the sign of the U-phase current Iu is positive (the case where a current flows from the power conversion unit 1 toward the electric motor 7), an ON time is lengthened by a time that is equal to a dead time and that is a time added by a dead time generation circuit 445 described later, and an OFF time is shortened by the time equal to the dead time. In addition, when the current sign is negative (the case where a current flows from the electric motor 7 toward the power conversion unit 1), the ON time is shortened by the time equal to the dead time, and the OFF time is lengthened by the time equal to the dead time.

Here, the time that is equal to the dead time and with which the adjustment is performed by the dead time correction circuit 443 is the value that is set and added by the dead time generation circuit 445, but is not limited to this value as described below regarding estimation and calculation of the dead time error.

In order to generate a switching signal Sx that is inverted with respect to a switching signal Su for operating the upper switching unit 11, a signal inversion circuit 444 generates a signal Sx2 obtained by inverting the signal Su2. The dead time generation circuit 445 sets and adds the dead time to the subsequent-stage switching signals Su2 and Sx2 to generate the switching signal Su for performing ON-OFF drive of the upper switching unit 11 and the switching signal Sx for performing ON-OFF drive of the lower switching unit 12.

With such a configuration, influence of the output voltage error due to the dead time can be theoretically prevented.

However, as a matter of fact, for a reason described below, a set value of the dead time that is set and added by the dead time generation circuit 445 does not agree with an effective value of the dead time that actually occurs in the power conversion unit 1. In the present specification, this error is referred to as a dead time error ΔTd.

The factor for the dead time error is very complicated, and, due to: the nonlinear temperature characteristic or current characteristic of a semiconductor device; a parasitic capacitance due to a wire length, which is not shown in FIG. 1; a response delay of a driver circuit for driving the semiconductor device; or the like, a delay occurs until the upper switching unit 11 and the lower switching unit 12 actually operate in response to ON-OFF signals that are the switching signals Su and Sx. In addition, a voltage waveform is theoretically approximated with a rectangular wave, but, as a matter of fact, a voltage waveform during a switching operation is not approximated with a rectangular wave and continuously changes with a certain gradient. This gradient actually changes complicatedly due to the nonlinear temperature characteristic or current characteristic of the semiconductor device and the circuit constant of the driver circuit.

FIG. 3 simulatively shows a situation of a dead time error occurring when it is assumed that a time delay occurs during the above-described dead time correction and switching operation. The left half of the drawing shows the case where the current direction is positive, and the right half of the drawing shows the case where the current direction is negative.

In FIG. 3, the upper part shows an operation of the dead time correction circuit 443, that is, an operation of: correcting the previous-stage switching signal Su1 from the switching signal generation circuit 442 with Td (correction amount); and outputting the subsequent-stage switching signal Su2.

The intermediate part shows an operation of the dead time generation circuit 445, that is, an operation of: setting and adding Td (set amount) to the subsequent-stage switching signals Su2 and the Sx2 from the dead time correction circuit 443; and outputting the switching signals Su and Sx to be sent to the upper switching unit 11 and the lower switching unit 12.

The lower part shows a U-phase voltage Vu during driving with the switching signals Su and Sx in the intermediate part. In the drawing, Ton and Toff in the case where the current direction is positive (the left part of the drawing) respectively show a time delay occurring at the time of rising and a time delay occurring at the time of falling in the upper switching unit 11. In addition, Toff and Ton in the case where the current direction is negative (the right part of the drawing) respectively show a time delay at the time of falling and a time delay at the time of rising in the lower switching unit 12.

In the result of FIG. 3, a dead time Td (actual amount) actually occurring in the case where the dead time of Td (set amount) is set and added by the dead time generation circuit 445 (see FIG. 2) is represented by an expression (3) when the case where the current direction is positive is shown.

$$Td(actual\ amount)=Td(set\ amount)+Ton-Toff \qquad (3)$$

Here, to compensate for a voltage error due to Td (set amount), correction is performed with Td (correction amount) by the dead time correction circuit 443 (see FIG. 2), and thus Td (error amount) occurring in this state is obtained by an expression (4) and this Td (error amount) becomes a dead time error.

$$Td(error\ amount)=Td(actual\ amount)-Td\ (correction\ amount) \qquad (4)$$

Therefore, in the case where the switching elements are driven by the PWM controller 44 shown in FIG. 2 of Embodiment 1, Td (error amount)=dead time error, which is shown in the expression (4), becomes a dead time that is a factor for actually causing an error in the output voltage of the power conversion unit 1, that is, a dead time effective value.

Where the dead time effective value=dead time error is denoted by $\Delta Td$, an output voltage error $\Delta Vtd$ occurring due to this $\Delta Td$ is obtained by an expression (5).

$$\Delta Vtd = \Delta Td \times Fc \times EFC \qquad (5)$$

In the case where the dead time correction circuit 443 is not adopted in the PWM controller 44 (the invention of the present application takes such a case within the assumed range), Td (actual amount) shown in the expression (3) becomes a dead time effective value, and the dead time error $\Delta Td$ is obtained by an expression (6).

$$\Delta Td=Td(actual\ amount)-Td(set\ amount) \qquad (6)$$

Referring back to FIG. 1, the configurations and calculation methods of a resistance value calculation unit 5 and a dead time error calculation unit 6 constituting a characteristic calculation unit 10 that is a main part of the invention of the present application, will be described below.

The resistance value calculation unit 5 calculates a resistance value of the electric motor 7 from the voltage command value Vd*, the d-axis current Id, and the carrier switching signal. The dead time error calculation unit 6 calculates a dead time error from the voltage command value Vd* and the carrier switching signal.

The configuration in FIG. 1 is a configuration in which the carrier switching signal is inputted to the resistance value calculation unit 5 and the dead time error calculation unit 6, but the present invention is not particularly limited to this, and any configuration may be employed as long as the frequency of the carrier used when PWM control is performed by the PWM controller 44 is recognized.

A processing unit 8 performs the above-described processes of the control unit 4, the resistance value calculation unit 5, and the dead time error calculation unit 6 by executing a program stored in a storage unit 9 described later.

Here, the storage unit 9 is composed of a memory in which the electric circuit constant of the electric motor 7, parameters required for control, and the program describing the above processes, etc. are stored. The processing unit 8 is composed of a microcomputer, a DSP (Digital Signal Processor), or a processor configured logically in a hardware circuit such as a FPGA. In addition, a plurality of processing units 8 and a plurality of storage units 9 cooperate to execute the above function.

Although not shown in FIG. 1, a program describing a process of later-described normal control (here, control in which the electric motor 7 that is used in applications such as a railway vehicle or an elevator is controlled to achieve a desired operation) may also be stored in the storage unit 9, and the processing unit 8 may be configured to execute the process of the normal control after execution of a process of the characteristic calculation unit 10 described below in detail.

In addition, the resistance value and the dead time error calculated by the resistance value calculation unit 5 and the dead time error calculation unit 6 may be stored once in the storage unit 9 and used as control parameters in the process of the normal control.

The invention of the present application has been made by focusing on the phenomenon that an actual dead time is not related to the frequency of the carrier for PWM control and an output voltage error occurring due to the presence of the dead time is proportional to the dead time.

The basic principle of the invention is as follows. Specifically, the control unit 4 is provided with the selector 45 for making a selection from a first carrier and a second carrier having a frequency different from the frequency of the first carrier and outputting the selected carrier as the carrier for PWM control, and the PWM controller 44 is configured to be able to generate a first switching signal based on the inputted voltage command value and the first carrier and a second switching signal based on the voltage command value and the second carrier.

Then, in a state where rotation of the electric motor 7 has stopped, the characteristic calculation unit 10: obtains a first operating characteristic of the power conversion unit 1 when the switching elements are driven with the first switching signal; obtains a second operating characteristic of the power conversion unit 1 when the switching elements are driven with the second switching signal; and calculates the resistance value of the electric motor 7 and the dead time error as targets from both operating characteristics.

As these operating characteristics, various characteristics can be targeted. In Embodiment 1, a description will be given with, as an example, the case where the power conversion device including the current controller 42 shown in FIG. 1 is used.

That is, here, characteristics obtained under a condition of control in which the current detection value detected by each current detection unit 2 is caused to follow the current command value, are used as both operating characteristics.

Specifically, the d-axis current command value Id* is set to a desired positive value (Id*>0), and the q-axis current command value Iq* is set to zero (Iq*=0).

In this case, a constant value that is such a phase θ0 that each phase current does not become zero is set as a phase θ inputted to the coordinate converters 41 and 43. The reason for setting as described above is that generally, determination as to nonlinearity and the sign of an error is difficult for an error voltage during a dead time period when the current value is approximately zero, so that dead time correction cannot be properly performed in some cases, and influence of the dead time error ΔTd very greatly appears.

Therefore, the coordinate converter 41 and the coordinate converter 43 perform coordinate conversion with θ=θ0 on the basis of calculation expressions shown in the following expression (7) and expression (8), respectively.

[Mathematical 3]

Mathematical 3

$$\begin{bmatrix} Id \\ Iq \end{bmatrix} = \sqrt{\frac{2}{3}} \begin{bmatrix} \cos\theta 0 & \cos\left(\theta 0 - \frac{2}{3\pi}\right) & \cos\left(\theta 0 + \frac{2}{3\pi}\right) \\ -\sin\theta 0 & -\sin\left(\theta 0 - \frac{2}{3\pi}\right) & -\sin\left(\theta 0 + \frac{2}{3\pi}\right) \end{bmatrix} \begin{bmatrix} Iu \\ Iv \\ Iw \end{bmatrix} \quad (7)$$

$$\begin{bmatrix} Vu^* \\ Vv^* \\ Vw^* \end{bmatrix} = \sqrt{\frac{2}{3}} \begin{bmatrix} \cos\theta 0 & -\sin\theta 0 \\ \cos\left(\theta 0 - \frac{2}{3\pi}\right) & -\sin\left(\theta 0 - \frac{2}{3\pi}\right) \\ \cos\left(\theta 0 + \frac{2}{3\pi}\right) & -\sin\left(\theta 0 + \frac{2}{3\pi}\right) \end{bmatrix} \begin{bmatrix} Vd^* \\ Vq^* \end{bmatrix} \quad (8)$$

Then, the above-described current command values are provided, and the switching elements are initially driven with the first switching signal generated with the first carrier (frequency Fc1). When the voltage and the current come into a steady state, the first operating characteristic is taken.

In this case, the configuration in FIG. 1 is a configuration with the control system using the publicly known dq-axis rotating coordinate system having two orthogonal axes as described above, so that it is possible to control the responses of the above Id and Iq, which are current values on the two orthogonal axes to be controlled by the control unit 4, with the predetermined current response target value. Accordingly, the current values can be set to a constant value within a desired period, and thus it is possible to instantly estimate the resistance value of the electric motor and the dead time error such that normal operation is not hampered.

In this respect, in the case where both operating characteristics are obtained under a condition of control in which the voltage command value is made constant, which will be described in Embodiment 2 below, about several seconds may be taken due to limitation by a time constant L/R, which is determined by an inductance L and a resistance value R of the electric motor 7, until the voltage command value becomes a steady-state value. In addition, this time varies depending on the type of the electric motor 7 to be driven.

On the other hand, in the case of FIG. 1, a time constant regarding current response of the current controller 42 is set to be sufficiently lower than the time constant L/R, whereby calculation and estimation at a high speed in a short time is realized, and the time of the calculation and estimation does not depend on the type of the electric motor 7.

For example, when the current response target value ωcc in the expression (2) is designed to be about 500 rad/s, each of the first operating characteristic and the second operating characteristic can be obtained in about 10 to 100 msec. Therefore, the current can be caused to respond regardless of the time constant L/R, and it is possible to shorten the time required for estimating and calculating the resistance value and the dead time error.

Next, a d-axis current Id1 and a d-axis voltage command value Vd1* are obtained from the first operating characteristic taken in the above-described manner, and a first resistance value R1 is calculated by an expression (9).

$$R1 = Vd1^*/Id1 \quad (9)$$

In a similar manner, the switching elements are driven with the second switching signal generated with the second carrier (frequency Fc2), and the second operating characteristic is taken when the voltage and the current come into a steady state.

Then, a d-axis current Id2 and a d-axis voltage command value Vd2* are obtained from the second operating characteristic, and a second resistance value R2 is calculated by an expression (10).

$$R2 = Vd2^*/Id2 \quad (10)$$

Here, Id1 and Id2 are controlled by the current controller 42 so as to satisfy Id1=Id2=Id*. Thus, where a true value of the resistance value is denoted by Rs, the following simultaneous equations are established.

$$Rs = (Vd1^* - \Delta Vtd1)/Id^* \quad (11)$$
$$= R1 - (\sqrt{2/3} \times \Delta Td \times Fc1 \times EFC)/Id^*$$

$$Rs = (Vd2^* - \Delta Vtd2)/Id^* \quad (12)$$
$$= R2 - (\sqrt{2/3} \times \Delta Td \times Fc2 \times EFC)/Id^*$$

When the simultaneous equations (11) and (12) are solved with Rs and ΔTd as unknown numbers, the resistance value Rs and the dead time error ΔTd are obtained by expressions (13) and (14), respectively.

$$Rs = (Fc1 \times R2 - Fc2 \times R1)/(Fc1 - Fc2)[\Omega] \quad (13)$$

$$\Delta Td = (Vd1^* - Vd2^*)/\{\sqrt{2/3} \times (Fc1 - Fc2) \times EFC\}[\sec] \quad (14)$$

As seen from the above expressions: the first operating characteristic and the second operating characteristic are obtained with the current command values Id* being set to be equal to each other; the first resistance value R1 is calculated from the current command value Id* and the voltage command value Vd1* in the first operating characteristic; the second resistance value R2 is calculated from the current command value Id* and the voltage command value Vd2* in the second operating characteristic; and the resistance value Rs of the electric motor 7 can be calculated from the first resistance value R1 and the second resistance value R2.

In addition, the first operating characteristic and the second operating characteristic are obtained with the current command values Id* being set to be equal to each other, and the dead time error ΔTd can be calculated from the difference between the voltage command value Vd1* in the first operating characteristic and the voltage command value Vd2* in the second operating characteristic.

Regarding the dead time correction circuit 443 in FIG. 2, Td (correction amount)=Td (set amount) in the above description. However, by adding the dead time error ΔTd obtained by the above expression (14) to previous Td (correction amount) through feedback, it is possible to further reduce the final dead time error, that is, more assuredly compensate for the output voltage error.

In addition, in the case where the dead time correction circuit is not provided, Td (actual amount) in the expression (3) corresponding to the dead time effective value is assigned to ΔTd in the above expressions (11) and (12). Thus, the dead time error in this case is a value obtained by subtracting Td (set amount) from ΔTd obtained from the above expression (14).

For compensation for the output voltage error in this case, a measure, such as correcting the voltage command value by using the dead time effective value, therefore, the value of the output voltage error=Td (actual amount)×Fc×EFC based on Td (actual amount), is conceivable.

Next, an example of a calculation step of estimating the resistance value Rs and the dead time error Δ Td by the resistance value calculation unit 5 and the dead time error calculation unit 6 described above, will be described with reference to FIG. 4.

Until time T0, a switching operation has stopped in the power conversion unit 1, and, for example, in a railway vehicle, this is a state where the vehicle has stopped. At time T2 described later, normal control, for example, operation is started. Therefore, in the example of FIG. 4, estimation and calculation is performed in a rotation stop state of the electric motor 7 immediately before the start of the normal control. As a matter of course, estimation and calculation can be performed in a rotation stop state of the electric motor 7 immediately after end of the normal control, which is different from the example of FIG. 4.

First, at time T0, the power conversion unit 1 is caused to perform a switching operation to start resistance value estimation. In a period from time T0 to time T1 (hereinafter, referred to as a first period), PWM control is performed with the first carrier (frequency Fc1), and current control is performed such that the d-axis current Id1 becomes the desired constant value Id*.

Here, a period from time T0 to time T0a is a transient response period until the d-axis current Id1 becomes the desired constant value. It is seen that in the transient response period, the resistance value is also not a constant value and it is difficult to correctly estimate the resistance value.

The transient response period can be shortened by setting the current response target value ωcc as described above, and is set to be sufficiently shorter than the time constant L/R of the electric motor 7.

Figure 4:
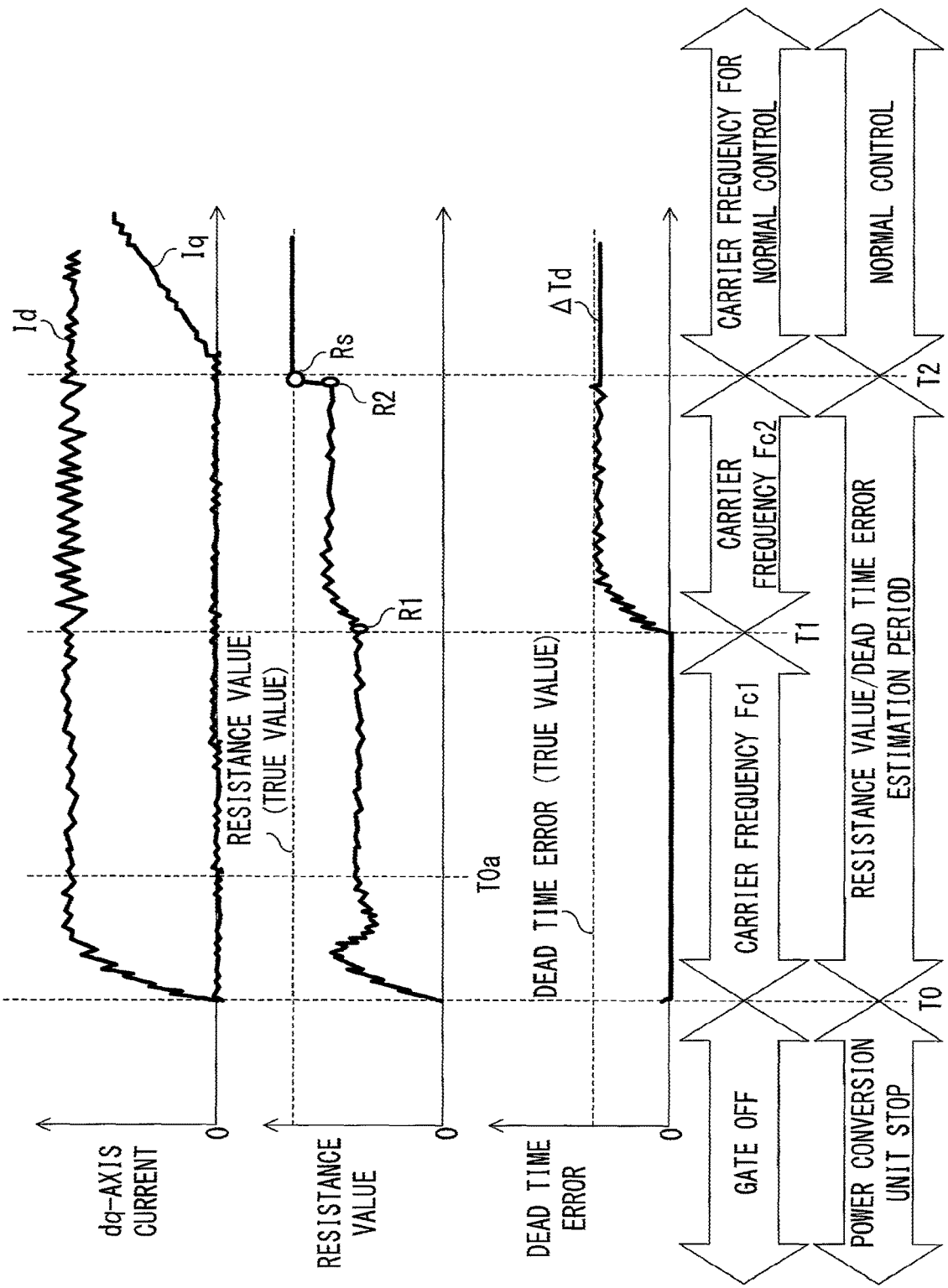
FIG. 4 is a timing chart illustrating an operation of performing calculation and estimation by a resistance value calculation unit 5 and a dead time error calculation unit 6 in FIG. 1.

Then, the first resistance value R1 is calculated from the first operating characteristic taken in a period from time T0a to time T1 in which the d-axis current Id1 is the constant value Id*, and is stored in the storage unit 9 together with the voltage command value Vd1* at this time. As shown in FIG. 4, when a dead time error is present, R1 is not the true value Rs but is a value with an error.

In addition, in the period from time T0 to time T1, calculation of the dead time error ΔTd is impossible, and thus the dead time error ΔTd is set to zero.

Next, in a period from time T1 to time T2 (hereinafter, referred to as a second period), the carrier is switched from the first carrier to the second carrier (frequency Fc2). Here, the d-axis current is continuously controlled to the constant value Id* without stopping the control. By so doing, a transient response period can be omitted when operating with the carrier frequency Fc2, which can contribute to shortening the time required for calculation for resistance value estimation.

Then, the second resistance value R2 is calculated from the second operating characteristic taken in the second period from time T1 to time T2 in which the d-axis current Id2 is the constant value Id*, and is stored in the storage unit 9 together with the voltage command value Vd2* at this time.

In this case, the first operating characteristic and the second operating characteristic are obtained under conditions of current values equal to each other, and thus the accuracy of estimation of the resistance value and the dead time error can be improved as compared to the case where the current values for the first and second operating characteristics are different from each other in Embodiment 2 described later.

The first and second resistance values R1 and R2 are obtained as described above, and thus the true value Rs of the resistance value can be estimated by the above expression (13) from both frequencies Fc1 and Fc2.

In addition, the dead time error ΔTd can be calculated by the above expression (14) from the voltage command values Vd1* and Vd2* in both operating characteristics, further both frequencies Fc1 and Fc2, and the voltage EFC of the DC power supply 3.

Through the resistance value/dead time error estimation period from time T0 to time T2 described above (the first period and the second period subsequent to the first period), in a normal control period from time T2, the estimated resistance value Rs and dead time error ΔTd are reflected as control parameters for normal motor control, and a shift is made to the normal motor control.

At this time, although not shown in FIG. 4, the carrier frequency is also switched to a carrier frequency Fc3 for the normal control. The reason for such a configuration is that by providing the carrier frequency Fc3 for the normal control, setting of a carrier frequency corresponding to a current response target value required for the normal control is enabled, the degree of freedom in designing the control system is improved, and the designing can be performed independently of the current response target value in the resistance value/dead time error estimation period.

In addition, by the configuration to shift continuously from the resistance value/dead time error estimation period to the normal control as shown in FIG. 4, it is possible to shift to the normal control, in which the power conversion unit 1 is caused to perform a switching operation to control the electric motor 7, in a short time from a state where switching of the power conversion unit 1 has stopped.

In the above, the carrier frequency Fc3 for the normal control is set to a value different from both the carrier frequency Fc1 and the carrier frequency Fc2, but is not limited thereto, and either one of the carrier frequency Fc1 and the carrier frequency Fc2 may be used as the carrier frequency Fc3.

In addition, a value adopted as each carrier frequency in an actual device is about 500 Hz to several tens of kilohertz.

Furthermore, in the description of FIG. 4, switching is made from the first period to the second period in a state where the current value is continuously controlled to the constant value, but the present invention is not limited thereto, and a gate-off period (in which the switching operation of the power conversion unit 1 is stopped to prevent current from flowing) may be provided between the first period and the second period.

In addition, regarding the above estimation and calculation, calculation is performed from Vd and Id on the dp-axis rotating coordinate having two orthogonal axes, but the present invention is not limited thereto, and calculation may be performed from the phase voltage and the phase current of each phase.

Moreover, in the case where the electric motor 7 is an inductive electric motor, the electric circuit configuration of the electric motor 7 is the configuration of a so-called T-type equivalent circuit including, in addition to a primary-side resistance and a primary-side inductance, a mutual inductance, a secondary-side inductance, and a secondary-side resistance. Thus, even if an attempt is made to control a primary-side current to a DC constant value, a voltage (e.g., corresponding to Vd1* and Vd2*) applied to the electric motor does not become a DC constant value in a short time, and changes depending on the time constant of the electric circuit which is determined by the mutual inductance and the secondary-side resistance. Accordingly, it is necessary to perform correction in consideration of this circuit response, for example, as in the following expression (15).

$$Vd^{**}=Vd^{*}\times \text{secondary-side circuit response} \quad (15)$$

Therefore, where a voltage command correction value in the case where PWM control is performed with the first carrier having the frequency Fc1 is denoted by Vd1 and a voltage command correction value in the case where PWM control is performed with the second carrier having the frequency Fc2 is denoted by Vd2, the dead time error ΔTd in the case where the electric motor 7 is an inductive electric motor can be calculated by an expression (16).

$$\Delta Td=(Vd1^{}-Vd2^{})/\{\sqrt{2/3}\times(Fc1-Fc2)\times EFC\}[\text{sec}] \quad (16)$$

As described above, the control unit 4 of the power conversion device according to Embodiment 1 is configured to be able to generate: the first switching signal based on the voltage command value and the first carrier having the frequency Fc1; and the second switching signal based on the voltage command value and the second carrier having the frequency Fc2 different from the frequency of the first carrier. Additionally, the characteristic calculation unit 10 is included which estimates and calculates either one of or both the resistance value Rs of the electric motor 7 and the dead time error ΔTd on the basis of: the first operating characteristic of the power conversion unit 1 obtained when the switching elements are driven with the first switching signal; and the second operating characteristic of the power conversion unit 1 obtained when the switching elements are driven with the second switching signal, in a state where rotation of the electric motor 7 has stopped. Thus, by the same characteristic calculation unit 10, not only either the resistance value Rs of the electric motor 7 or the dead time error ΔTd can be estimated and calculated, but both of them can also be estimated and calculated simultaneously. In addition, the conditions for a main circuit are not changed as in Patent Document 1, it is sufficient to change the settings for control, and estimation and calculation in a short time is realized.

Moreover, the current controller 42 is included, the first operating characteristic and the second operating characteristic are obtained under the condition of control in which the current detection value detected by each current detection unit 2 is caused to follow the current command value, and the time constant regarding current response of the current controller 42 is set to be lower than the time constant determined by the inductance value and the resistance value of the electric motor 7. Thus, it is possible to identify the resistance value and the dead time error with high accuracy in such a short time that the normal control of the power conversion device is not hampered.

Accordingly, by reflecting these estimated values as parameters for the normal control, performance degradation of a control device can be prevented even under a condition in which the resistance value of the electric motor 7 greatly varies depending on the temperature thereof. In addition, since the dead time error can also be identified with high accuracy in a short time, performance degradation of the control device due to the dead time error can also be prevented.

Furthermore, safety improvement by improvement of the accuracy of output torque or speed control of the electric motor, energy saving by high efficiency thereof, an environmental load reduction by low noise thereof, etc. are achieved.

Embodiment 2

Figure 5:
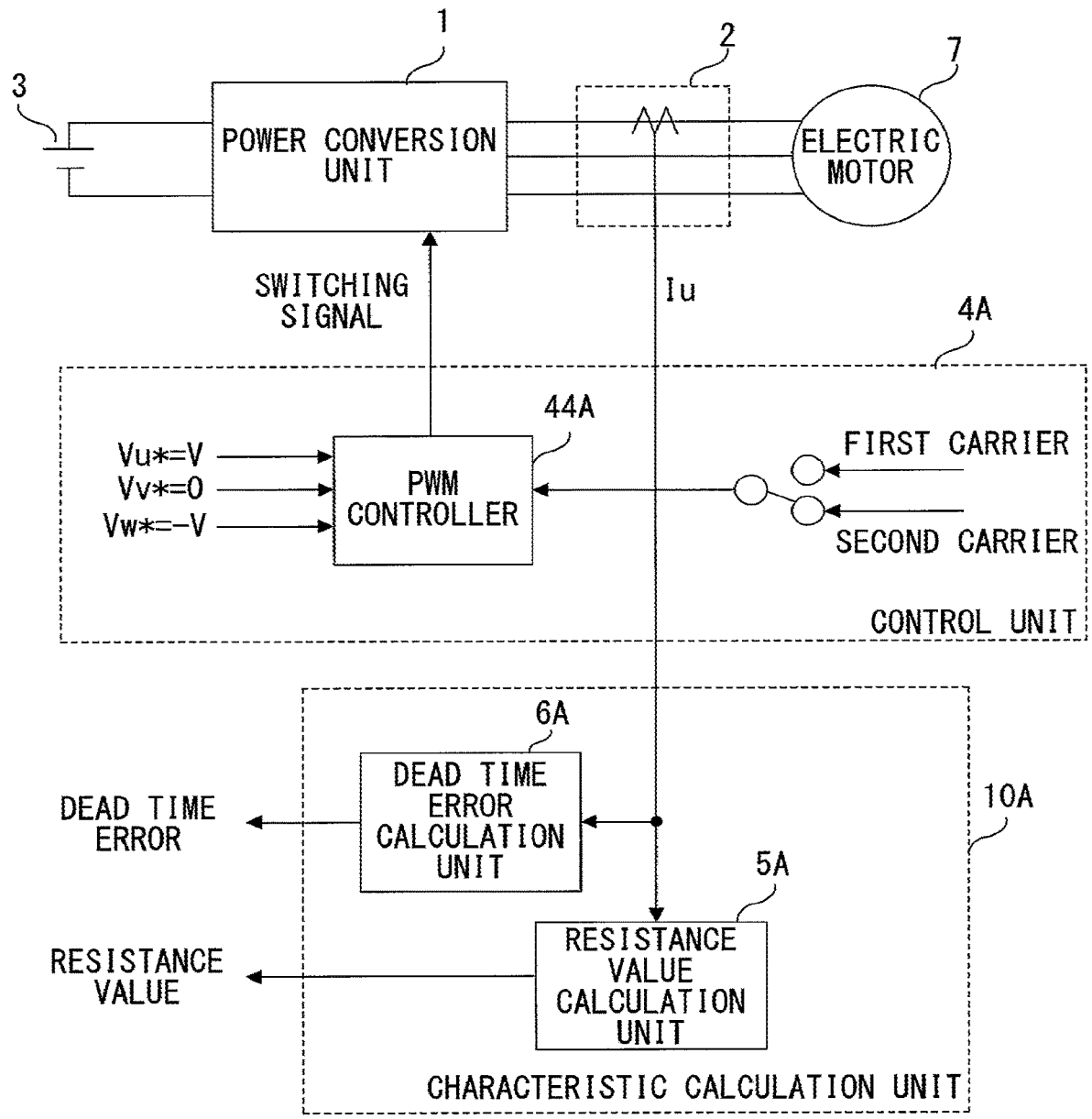
FIG. 5 is a diagram showing the configuration of a power conversion device according to Embodiment 2 of the present invention.

FIG. 5 is a diagram showing the configuration of a power conversion device according to Embodiment 2 of the present invention. Embodiment 2 is different from Embodiment 1 in that whereas the first operating characteristic and the second operating characteristic are obtained under the condition of control in which the current detection value detected by each current detection unit 2 is caused to follow the current command value in Embodiment 1 described above, the first operating characteristic and the second operating characteristic are obtained under a condition of control in which the voltage command value is made constant in Embodiment 2. Hereinafter, a specific configuration and an operation of estimation and calculation will be described.

A control unit 4A in FIG. 5 is configured such that fixed values, Vu*=V, Vv*=0, and Vw*=−V are provided as voltage command values to be inputted to a PWM controller 44A thereof, whereby a DC voltage of 2V is applied between the U phase and the V phase of the electric motor 7 and a DC current flows through the electric motor 7.

FIG. 6 is a diagram showing an equivalent circuit when operations of the power conversion unit 1 and the electric motor 7 reach a steady state in the configuration of FIG. 5. Here, R in FIG. 6 is a resistance value of each winding of the electric motor 7.

In the case of FIG. 6(a) in which there is no output voltage error due to a dead time, the resistance value Rs can be calculated as Rs=V/Iu. However, in the case of FIG. 6(b) in which there is an output voltage error ΔVtd that is an unknown value, a true value cannot be obtained unless the resistance value Rs is calculated as Rs=(V−ΔVtd)/Iu. If V=5 [V] and R=0.05 [Ω], Iu=100[A] and Rs=V/Iu=0.05 [Ω] in the case of FIG. 6(a), so that a true value can be estimated.

Meanwhile, in the case of FIG. 6(b), as described above with reference to FIG. 2 of Embodiment 1, dead time correction is performed, and, assuming that the effective value of the dead time corresponds to the dead time error ΔTd, if ΔTd is 1 [μs], further Fc=1000 [Hz], and EFC=1500 [V], the output voltage error ΔVtd corresponds to 1.5 [V]. In this case, only a current of Iu=70 [A] flows, and the resistance value Rs is Rs=V/Iu≈0.071 [Ω], so that a true value cannot be estimated. In the case of the above example, a result including an estimation error of about 30% is obtained.

Thus, similarly as described above in Embodiment 1, the first operating characteristic when the switching elements are driven through PWM control using the first carrier having the frequency Fc1, and the second operating characteristic when the switching elements are driven through PWM control using the second carrier having the frequency Fc2 different from the frequency Fc1, are obtained.

Specifically, where a current obtained from the first operating characteristic is denoted by Iu1 and a current obtained from the second operating characteristic is denoted by Iu2, the following simultaneous equations are established with the true value of the resistance value as Rs, the DC voltage command value as V*, and the voltage value of the DC power supply 3 as EFC.

$$Rs = (V^* - \Delta Vtd1)/Iu1 \quad (17)$$
$$= (V^* - \Delta Td \times Fc1 \times EFC)/Iu1$$

$$Rs = (V^* - \Delta Vtd2)/Iu2 \quad (18)$$
$$= (V^* - \Delta Td \times Fc2 \times EFC)/Iu2$$

When the simultaneous equations (17) and (18) are solved with Rs and ΔTd as unknown numbers, the resistance value Rs and the dead time error ΔTd are obtained by expressions (19) and (20), respectively.

$$Rs = V^* \times (Fc1-Fc2)/(Fc1 \times Iu2 - Fc2 \times Iu1)[\Omega] \quad (19)$$

$$\Delta Td = V^* \times (Iu1-Iu2)/\{EFC \times (Fc2 \times Iu1 - Fc1 \times Iu2)\}[\sec] \quad (20)$$

As seen from the above expressions, the first operating characteristic and the second operating characteristic are obtained with the voltage command values V* being set to be equal to each other, and the resistance value Rs of the electric motor 7 can be calculated from the first current detection value Iu1, detected by the current detection unit 2, in the first operating characteristic and the second current detection value Iu2, detected by the current detection unit 2, in the second operating characteristic.

In addition, the first operating characteristic and the second operating characteristic are obtained with the voltage command values V* being set to be equal to each other, and the dead time error ΔTd can be calculated from the difference between the first current detection value Iu1, detected by the current detection unit 2, in the first operating characteristic and the second current detection value Iu2, detected by the current detection unit 2, in the second operating characteristic.

As described above, similarly as in the case of Embodiment 1 described above, the control unit 4A of the power conversion device according to Embodiment 2 is configured to be able to generate: the first switching signal based on the voltage command value and the first carrier having the frequency Fc1; and the second switching signal based on the voltage command value and the second carrier having the frequency Fc2 different from the frequency of the first carrier. Additionally, a characteristic calculation unit 10A is included which estimates and calculates either one of or both the resistance value Rs of the electric motor 7 and the dead time error ΔTd on the basis of: the first operating characteristic of the power conversion unit 1 obtained when the switching elements are driven with the first switching signal; and the second operating characteristic of the power conversion unit 1 obtained when the switching elements are driven with the second switching signal, in a state where rotation of the electric motor 7 has stopped. Thus, by the same characteristic calculation unit 10A, not only either the resistance value Rs of the electric motor 7 or the dead time error ΔTd can be estimated and calculated, but both of them can also be estimated and calculated simultaneously. In addition, the conditions for a main circuit are not changed as in Patent Document 1, it is sufficient to change the settings for control, and estimation and calculation in a short time is realized.

Since the first operating characteristic and the second operating characteristic are obtained under the condition of control in which the voltage command value is made constant, a current control mechanism for causing the current detection value to follow the current command value is not required. Therefore, as seen from FIG. 5, there is an advantage in that application to a power conversion device that drives and controls an electric motor with a simple control configuration, is possible.

Embodiment 3

In Embodiment 3, the case where switching elements each composed of a wide bandgap semiconductor such as silicon carbide (SiC) as a material are used as the switching elements included in the power conversion unit 1 in the above embodiments, will be described.

The configuration in a drawing is the same as in the cases of the above embodiments, and thus the description thereof is omitted here.

The switching elements used in the power conversion unit 1 are generally semiconductor transistor elements (IGBTs, MOSFETs, etc.) containing silicon (Si) as a material and semiconductor diode elements similarly containing silicon as a material, these semiconductor transistor elements being connected in reverse parallel. The technique described in the above embodiments can be used in a power convertor including the general switching elements.

Meanwhile, the technique described in the above embodiments is not limited to the switching elements formed with silicon as a material. As a matter of course, switching elements each composed of a wide bandgap semiconductor such as silicon carbide (SiC) instead of silicon, which have been drawing attention as low-loss high-voltage-resistance semiconductor elements in recent years, can be used in a power converter.

Here, silicon carbide, which is one of wide bandgap semiconductors, has a characteristic in that silicon carbide is able to significantly reduce loss occurring in a semiconductor element and allows the semiconductor element to be used at a high temperature, as compared to silicon. Thus, when switching elements containing silicon carbide as a material are used as the switching elements included in the power conversion unit, the allowable operating temperature of a switching element module can be increased to the high-temperature side, so that it is possible to increase the carrier frequency to improve the operating efficiency of the electric motor.

By taking advantage of such a characteristic of the wide bandgap semiconductor, it is possible for the characteristic calculation unit 10 described in the above embodiment to identify the resistance value of the electric motor and the dead time error in a shorter time.

As described above in Embodiment 1, in order to execute identification and calculation in a short time, it is important to set a current to be supplied to the electric motor 7, as quickly as possible. This is achieved by increasing, as much as possible, the predetermined current response target value ωcc for designing the responses of the above Id and Iq to be controlled by the control unit 4. However, setting of the current response target value ωcc is limited by the carrier frequency.

Generally, the current response target value ωcc is set to be about 1/10 of the carrier frequency Fc, and control becomes unstable when the current response target value ωcc is set to be a value higher than the above. Therefore, when switching elements each composed of a wide bandgap semiconductor such as silicon carbide (SiC) as a material are used as the switching elements included in the power conversion unit 1, it is possible to identify the resistance value and the dead time error in a short time, since the carrier frequency can be set to be higher than that in the case where switching elements each composed of a non-wide bandgap semiconductor containing silicon or the like as a material are used.

In the case where calculation and estimation is performed with one type of carrier unlike the present invention, even when the carrier frequency is merely increased, there is a possibility that variation of a calculation-estimation value becomes very great due to the relationship between the accuracy of the dead time error and the accuracy of the resistance value as described above.

On the other hand, with the technique according to the present invention described above in Embodiment 1, in the power conversion device which performs PWM control, even when the switching elements containing silicon carbide as a material are used and the carrier frequency is increased to shorten the identification time as described above, it becomes possible to identify the resistance value of the electric motor and the dead time error with high accuracy, by providing: the first period in which PWM control is performed with the first carrier and the first operating characteristic is obtained; and the second period in which PWM control is performed with the second carrier and the second operating characteristic is obtained.

Silicon carbide (SiC) is one example of semiconductors called wide bandgap semiconductors by having a characteristic in that the bandgap thereof is larger than that of silicon (Si). Other than silicon carbide, for example, semiconductors formed by using a gallium-nitride-based material or diamond also belong to wide bandgap semiconductors, and their characteristics have many similarities to those of silicon carbide. Therefore, a configuration in which another wide bandgap semiconductor other than silicon carbide is used is also encompassed in the gist of the present invention.

As described above, in the power conversion device according to Embodiment 3, the switching elements each composed of a wide bandgap semiconductor such as silicon carbide (SiC) as a material are used as the switching elements included in the power conversion unit 1 of the above embodiment. Thus, the power conversion device achieves an unprecedented effect that the accuracy of identification of the resistance value of the electric motor and the dead time error is improved and further the identification is completed in a short time.

Meanwhile, in the case where the switching elements each composed of a wide bandgap semiconductor such as silicon carbide (SiC) as a material are used as the switching elements included in the power conversion unit 1, the carrier frequency can be increased even during normal control to improve the control response. However, in this case, the output voltage error ΔVtd due to the dead time error influences the control to such a degree that the influence is not negligible. Thus, there is a possibility that it is difficult to improve the control response to a desired response.

However, in such a case as well, it is needless to say that storing the resistance value and the dead time error identified by the present invention in the storage unit 9 and reflecting the resistance value and the dead time error as control parameters for the normal control can contribute to improvement of the control response of the normal control.

Each of the configurations described above in Embodiments 1 to 3 shows an example of the contents of the present invention, may be combined with another publicly known technique, and may be partially omitted or changed without departing from the gist of the present invention.

Each of the configurations described above in Embodiments 1 to 3 shows that the resistance value of the electric motor 7 and the dead time error are identified with high accuracy in a state where rotation of the electric motor 7 has stopped, but the present invention is not limited thereto, and the same advantageous effects can be achieved even in a state where the electric motor 7 is slightly rotating. Specifically, the rotational period of the electric motor 7 suffices to be greater than the identification period of the present invention, and it is needless to say that the range of application of the present invention expands as the identification period of the present invention decreases.

Embodiment 4

Figure 7:
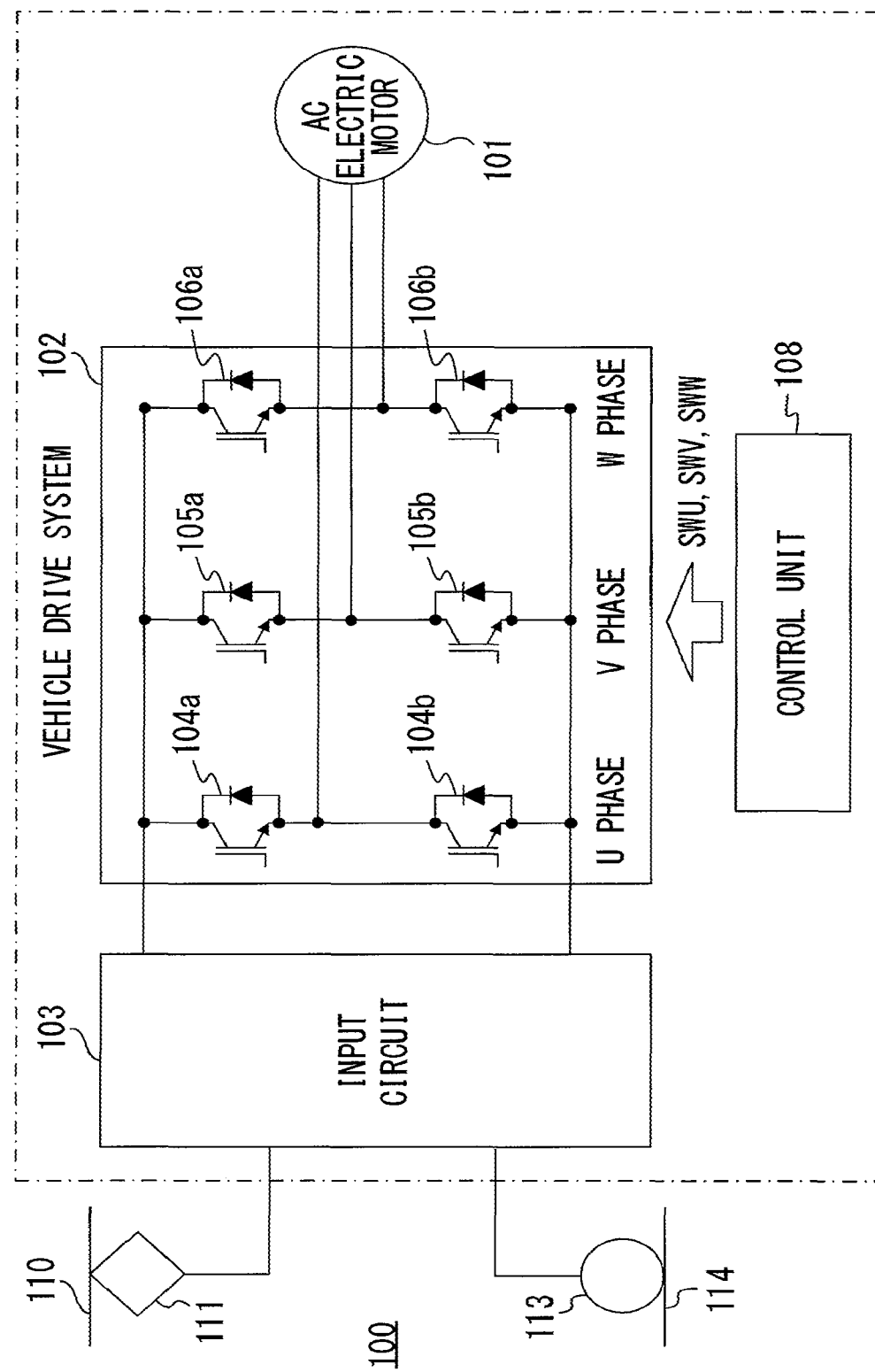
FIG. 7 is a diagram showing one configuration example of a vehicle drive system, according to Embodiment 4 of the present invention, in which a power conversion device is applied to a railway vehicle.

FIG. 7 is a diagram showing one configuration example of a vehicle drive system in which the power conversion device according to Embodiments 1 to 3 of the present invention is applied to a railway vehicle. The vehicle drive system according to Embodiment 4 includes an AC electric motor 101, a power conversion unit 102, a control unit 108, and an input circuit 103.

The AC electric motor 101 corresponds to the electric motor 7 shown in FIG. 1 and is mounted on a railway vehicle. The power conversion unit 102 is the same as the power conversion unit 1 shown in FIG. 1 and includes switching elements 104a, 105a, 106a, 104b, 105b, and 106b.

The control unit 108 includes all of the control unit 4, the processing unit 8, and the storage unit 9 shown in FIG. 1 and generates switching signals SWU, SWV, and SWW for performing ON-OFF control of the switching elements 104a to 106b of the power conversion unit 102.

Although not shown, the input circuit 103 is configured to include a switch, a filter capacitor, a filter reactor, etc. The input side of the input circuit 103 is connected via a current collector 111 and a wheel 113 to a wire 110, forming a feeding circuit 100, and a rail 114, and the output side of the input circuit 103 is connected to the power conversion unit 102. For example, the input circuit 103 is supplied with DC power or AC power from the wire 110 and generates DC power to be supplied to the power conversion unit 102.

The power conversion unit 102 converts the DC voltage supplied from the input circuit 103 to an AC voltage, which is an arbitrary voltage having an arbitrary frequency, and drives the AC electric motor 101.

By applying the power conversion device described in Embodiments 1 to 3 to the vehicle drive system as described above, degradation of the control performance can be prevented even under a condition in which the resistance value of the AC electric motor 101 greatly varies depending on the temperature thereof, as described in these embodiments. In addition, degradation of the control performance due to the dead time error can also be prevented.

Furthermore, by also preventing degradation of the control performance as described above, vehicle control can be achieved in which safety improvement and improvement of riding comfort by improvement of the accuracy of output torque or speed control of the electric motor, energy saving by high efficiency thereof, an environmental load reduction by low noise thereof, etc. can be achieved.

It is noted that, within the scope of the present invention, the above embodiments may be freely combined with each other, or each of the above embodiments may be modified or simplified as appropriate.

The invention claimed is:

1. A power conversion device comprising:
a power conversion unit having a bridge formed by connecting switching elements in series with each other between both electrodes of a DC power supply, the power conversion unit converting a voltage of the DC power supply and supplying the converted voltage to an electric motor;
a current detection unit detecting a current flowing into the electric motor; and
a control unit setting and adding a dead time for preventing DC short circuit caused by the switching elements forming the bridge, and generating a switching signal for performing ON-OFF drive of the switching elements, through PWM control on the basis of a voltage command value and a carrier, wherein
the control unit is configured to be able to generate a first switching signal based on the voltage command value and a first carrier and a second switching signal based on the voltage command value and a second carrier having a frequency different from a frequency of the first carrier, and
the power conversion device comprises a characteristic calculation unit estimating and calculating at least one of a resistance value of the electric motor and a dead time error, which is a difference between an effective value of the dead time and a set value of the dead time, on the basis of a first operating characteristic including the voltage command value of the power conversion unit obtained when the switching elements are driven with the first switching signal and a second operating characteristic including the voltage command value of the power conversion unit obtained when the switching elements are driven with the second switching signal.

2. The power conversion device according to claim 1, wherein the first operating characteristic and the second operating characteristic are obtained under a condition of control in which a current detection value detected by the current detection unit is caused to follow a current command value.

3. The power conversion device according to claim 2, wherein
the control unit includes: a current controller generating the voltage command value such that a deviation between the current detection value detected by the current detection unit and the current command value becomes zero; a selector making a selection from the first carrier and the second carrier and outputting a selected carrier; and a PWM controller generating the switching signal on the basis of the voltage command value and the carrier outputted from the selector, and
the characteristic calculation unit sets a DC value as the current command value, and estimates and calculates at least one of the resistance value of the electric motor and the dead time error on the basis of the first operating characteristic obtained with the first switching signal from the PWM controller and the second operating characteristic obtained with the second switching signal from the PWM controller.

4. The power conversion device according to claim 3, wherein the PWM controller includes:
a modulation wave generation circuit normalizing the voltage command value with a voltage value of the DC power supply and outputting a modulation wave;
a switching signal generation circuit generating a previous-stage switching signal through the PWM control on the basis of the modulation wave and the carrier;
a dead time correction circuit correcting the previous-stage switching signal so as to compensate for an output voltage error occurring due to the dead time, and generating a subsequent-stage switching signal; and
a dead time generation circuit setting and adding a dead time set value to the subsequent-stage switching signal and generating the switching signal for performing ON-OFF drive of the switching elements.

5. The power conversion device according to claim 3, wherein a time constant regarding current response of the current controller is set to be lower than a time constant determined by an inductance value and a resistance value of the electric motor.

6. The power conversion device according to claim 2, wherein
the characteristic calculation unit calculates the resistance value of the electric motor, and
the first operating characteristic and the second operating characteristic are obtained with the current command values being set to be equal to each other, a first resistance value is calculated from the current command value and the voltage command value in the first operating characteristic, a second resistance value is calculated from the current command value and the voltage command value in the second operating characteristic, and the resistance value of the electric motor is calculated from the first resistance value and the second resistance value.

7. The power conversion device according to claim 2, wherein
the characteristic calculation unit calculates the dead time error, and
the first operating characteristic and the second operating characteristic are obtained with the current command values being set to be equal to each other, and the dead time error is calculated from a difference between the voltage command value in the first operating characteristic and the voltage command value in the second operating characteristic.

8. The power conversion device according to claim 1, wherein the first operating characteristic and the second operating characteristic are obtained under a condition of control in which the voltage command value is made constant.

9. The power conversion device according to claim 8, wherein
the characteristic calculation unit calculates the resistance value of the electric motor, and
the first operating characteristic and the second operating characteristic are obtained with the voltage command values being set to be equal to each other, and the resistance value of the electric motor is calculated from a first current detection value, detected by the current detection unit, in the first operating characteristic and a second current detection value, detected by the current detection unit, in the second operating characteristic.

10. The power conversion device according to claim 8, wherein the characteristic calculation unit calculates the dead time error, and the first operating characteristic and the second operating characteristic are obtained with the voltage command values being set to be equal to each other, and the dead time error is calculated from a difference between a first current detection value, detected by the current detection unit, in the first operating characteristic and a second current detection value, detected by the current detection unit, in the second operating characteristic.

11. The power conversion device according to claim 1, wherein the characteristic calculation unit obtains the first operating characteristic in a first period and obtains the second operating characteristic in a second period subsequent to the first period.

12. The power conversion device according to claim 11, wherein the first period and the second period are set immediately before start of normal control of the electric motor.

13. The power conversion device according to claim 11, wherein the first period and the second period are set immediately after end of normal control of the electric motor.

14. The power conversion device according to claim 1, wherein the switching elements are each formed from a wide bandgap semiconductor.

15. The power conversion device according to claim 14, wherein the wide bandgap semiconductor is a semiconductor for which at least one of silicon carbide, a gallium-nitride-based material, and diamond is used.

16. The power conversion device according to claim 14, wherein the frequencies of the first carrier and the second carrier of the switching elements each formed from the wide bandgap semiconductor are set to be higher than a frequency of a carrier of switching elements each formed from a non-wide bandgap semiconductor.

17. A vehicle drive system comprising:
a power conversion device;
an input circuit connected between a feeding circuit and the power conversion device and generating power to the power conversion device; and
an electric motor driven by the power conversion device, the power conversion device comprises:
a power conversion unit having a bridge formed by connecting switching elements in series with each other between both electrodes of a DC power supply, the power conversion unit converting a voltage of the DC power supply and supplying the converted voltage to the electric motor;
a current detection unit detecting a current flowing into the electric motor; and
a control unit setting and adding a dead time for preventing DC short circuit caused by the switching elements forming the bridge, and generating a switching signal for performing ON-OFF drive of the switching elements, through PWM control on the basis of a voltage command value and a carrier, wherein the control unit is configured to be able to generate a first switching signal based on the voltage command value and a first carrier and a second switching signal based on the voltage command value and a second carrier having a frequency different from a frequency of the first carrier, and the power conversion device further comprises a characteristic calculation unit estimating and calculating at least one of a resistance value of the electric motor and a dead time error, which is a difference between an effective value of the dead time and a set value of the dead time, on the basis of a first operating characteristic including the voltage command value of the power conversion unit obtained when the switching elements are driven with the first switching signal and a second operating characteristic including the voltage command value of the power conversion unit obtained when the switching elements are driven with the second switching signal.

18. A power conversion device comprising:
a power conversion unit having a bridge formed by connecting switching elements in series with each other between both electrodes of a DC power supply, the power conversion unit converting a voltage of the DC power supply and supplying the converted voltage to an electric motor;
a current detection unit detecting a current flowing into the electric motor; and
a control unit setting and adding a dead time for preventing DC short circuit caused by the switching elements forming the bridge, and generating a switching signal for performing ON-OFF drive of the switching elements, through PWM control on the basis of a voltage command value and a carrier, wherein the control unit is configured to be able to generate a first switching signal based on the voltage command value and a first carrier and a second switching signal based on the voltage command value and a second carrier having a frequency different from a frequency of the first carrier, and the power conversion device comprises a characteristic calculation unit estimating and calculating at least one of a resistance value of the electric motor defined by a formula including the voltage command value as a factor thereof and a dead time error defined by a formula including the voltage command value as a factor thereof, which is a difference between an effective value of the dead time and a set value of the dead time, on the basis of a first operating characteristic including the voltage command value of the power conversion unit obtained when the switching elements are driven with the first switching signal and a second operating characteristic including the voltage command value of the power conversion unit obtained when the switching elements are driven with the second switching signal.

\* \* \* \* \*